United States Patent
Miyake et al.

(10) Patent No.: US 10,396,363 B2
(45) Date of Patent: Aug. 27, 2019

(54) COPPER FOIL, NEGATIVE ELECTRODE CURRENT COLLECTOR AND NEGATIVE ELECTRODE MATERIAL FOR NON-AQUEOUS SECONDARY BATTERY

(71) Applicant: MITSUI MINING & SMELTING CO., LTD., Tokyo (JP)

(72) Inventors: Koichi Miyake, Saitama (JP);
Tomoyuki Maeda, Saitama (JP);
Kazutaka Hozumi, Saitama (JP);
Hiroaki Nakahara, Saitama (JP);
Shinichi Yamauchi, Saitama (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 1212 days.

(21) Appl. No.: 14/402,501

(22) PCT Filed: May 21, 2013

(86) PCT No.: PCT/JP2013/064050
§ 371 (c)(1),
(2) Date: Nov. 20, 2014

(87) PCT Pub. No.: WO2013/176115
PCT Pub. Date: Nov. 28, 2013

(65) Prior Publication Data
US 2015/0132658 A1    May 14, 2015

(30) Foreign Application Priority Data

May 22, 2012 (JP) ................................ 2012-116229

(51) Int. Cl.
*H01M 4/66* (2006.01)
*C22C 9/04* (2006.01)
(Continued)

(52) U.S. Cl.
CPC .......... *H01M 4/662* (2013.01); *B23K 35/0233* (2013.01); *B23K 35/3046* (2013.01);
(Continued)

(58) Field of Classification Search
CPC ...... H01M 4/662; H01M 4/661; H01M 4/666; H01M 4/667; H01M 2004/8684
(Continued)

(56) References Cited

U.S. PATENT DOCUMENTS 6,329,074 B1    12/2001  Fujiwara et al.
2002/0098374 A1  7/2002  Fujiwara et al.
(Continued)

FOREIGN PATENT DOCUMENTS

CN    1484868 A    3/2004
CN    102422465 A   4/2012
(Continued)

OTHER PUBLICATIONS

English translation of Sakai, JP 2009-221592, Oct. 2009, Japanese (Year: 2009).*
(Continued)

*Primary Examiner* — Cynthia H Kelly
*Assistant Examiner* — Rashid A Alam
(74) *Attorney, Agent, or Firm* — Greenblum & Bernstein, P.L.C.

(57) ABSTRACT

An object of the present invention is to provide a copper foil inexpensive and sufficient in tensile strength even after heat treatment. The copper foil includes zinc in a content range of 0.02% by mass to 2.7% by mass in the total mass of the entire copper foil, and if the regions in thicknesses direction from both surfaces of the copper foil where occupies 5% by mass in the total mass of the entire copper foil are referred to as the respective external layers and a region between one external layer and the other external layer is referred to as an
(Continued)

internal layer, the internal layer includes copper as a main element and includes 100 ppm or more of one or mixture of small amount-elements selected from carbon, sulfur, chlorine and nitrogen, and includes zinc at 10% or more in the total mass of zinc included in the entire copper foil.

7 Claims, 5 Drawing Sheets

(51) Int. Cl.
*C25D 1/04* (2006.01)
*C25D 7/06* (2006.01)
*C23C 28/02* (2006.01)
*C22C 18/00* (2006.01)
*B23K 35/30* (2006.01)
*B23K 35/02* (2006.01)
*H01M 10/0525* (2010.01)

(52) U.S. Cl.
CPC ............... *C22C 9/04* (2013.01); *C22C 18/00* (2013.01); *C23C 28/021* (2013.01); *C25D 1/04* (2013.01); *C25D 7/0614* (2013.01); *H01M 10/0525* (2013.01)

(58) Field of Classification Search
USPC ........................................................ 429/245
See application file for complete search history.

(56) References Cited

U.S. PATENT DOCUMENTS

| | | | |
|---|---|---|---|
| 2002/0192554 A1* | 12/2002 | Woo | H01M 4/131 429/231.8 |
| 2010/0038115 A1 | 2/2010 | Matsuda et al. | |
| 2013/0115510 A1* | 5/2013 | Tani | H01M 4/0404 429/199 |
| 2013/0295407 A1* | 11/2013 | Obata | C23C 2/02 428/607 |

FOREIGN PATENT DOCUMENTS

| | | | | | |
|---|---|---|---|---|---|
| JP | 2000-165037 A | | 6/2000 | | |
| JP | 2001-256968 A | | 9/2001 | | |
| JP | 2005-197205 A | | 7/2005 | | |
| JP | 2005-350761 A | | 12/2005 | | |
| JP | 2005-353384 A | | 12/2005 | | |
| JP | 2007-200686 A | | 8/2007 | | |
| JP | 2007-217787 A | | 8/2007 | | |
| JP | 2009221592 A | * | 10/2009 | | C22C 9/00 |
| JP | 2011-12297 A | | 1/2011 | | |
| JP | WO 2012002304 A1 | * | 1/2012 | | H01M 4/0404 |
| TW | 200927993 A | | 7/2009 | | |
| TW | 200936817 A | | 9/2009 | | |

OTHER PUBLICATIONS

International Search Report issued with respect to application No. PCT/JP2013/064050, dated Aug. 20, 2013.
Taiwanese Office Action issued with respect to application No. 10321437470, dated Oct. 16, 2014.
Taiwanese Office Action issued for application No. 102117851, dated Apr. 20, 2015; with partial translation.

* cited by examiner

COPPER FOIL, NEGATIVE ELECTRODE CURRENT COLLECTOR AND NEGATIVE ELECTRODE MATERIAL FOR NON-AQUEOUS SECONDARY BATTERY

TECHNICAL FIELD

The present invention relates to a copper foil, a negative electrode current collector and a negative electrode material for a non-aqueous secondary battery. In particular, relates to a copper foil used as a negative electrode current collector in a lithium ion secondary battery, the negative electrode current collector and a negative electrode material using the copper foil.

BACKGROUND ART

A copper foil has been used as a material for formation of wiring included in various types of electronic devices including printed wiring boards. In recent years, copper foils have been used not only as a material for formation of wiring but also as a negative electrode current collector of non-aqueous secondary batteries including lithium ion secondary battery.

A negative electrode material of a lithium ion secondary battery is provided with a negative electrode mixture layer including a negative electrode active substance, a conductive material, a binder on the surface of a negative electrode current collector made of a conductive material (for example, see "Patent Document 1"). If a negative electrode active substance store/release lithium in charging/discharging of lithium ion secondary battery, the volume of the negative electrode active substance changes. Expansion/contraction of the negative electrode mixture layer applies a stress between the negative electrode mixture layer and the current collector since the negative electrode mixture layer adheres to the surface of a negative electrode current collector. Repeated charging/discharging cycle applies stresses on the negative electrode current collector again and again. If tensile strength of the negative electrode current collector is low, the negative electrode current collector cannot follow the volume change of the negative electrode mixture, and expands and causes deformation including wrinkles and breaks. If the negative electrode current collector expands and causes deformation such as wrinkles, short circuit causes between a positive electrode and a negative electrode, or the gap between the positive electrode and the negative electrode changes, to make a uniform electrode reaction hard and may result reduced charging/discharging cycle durability. If the negative electrode current collector breaks, the capacity per unit volume reduces and results decreased battery performance of the lithium ion secondary battery. So, if a copper foil is used as the negative electrode current collector, the copper foil is demanded a high tensile strength.

By the way, in the manufacturing process of a negative electrode material, high-temperature is loaded when a negative electrode mixture layer is provided on the surface of a negative electrode current collector. In the popular copper foils, tensile strength decreases if a high-temperature is loaded. So, copper foils used as a negative electrode current collectors are demanded to maintain a high tensile strength also after the heat treatment. For example, Patent Document 2 discloses an electro-deposited copper foil provided with a hard nickel-plated layer as such a copper foil. Patent Document 3 discloses an electro-deposited copper foil provided with a cobalt-plated layer or a cobalt-nickel alloy-plated layer. Patent Documents 2 and 3 disclose that these electro-deposited copper foils maintain a sufficient-level tensile strength even after heat treatment.

DOCUMENTS CITED

Patent Documents

Patent Document 1: Japanese Patent Laid-Open No. 2007-200686
Patent Document 2: Japanese Patent Laid-Open No. 2005-197205
Patent Document 3: Japanese Patent Laid-Open No. 2005-350761

SUMMARY OF THE INVENTION

Problems to be Solved

However, supply of a copper foil being less expensive and having a sufficient tensile strength even after heat treatment has been demanded since the electro-deposited copper foils disclosed in Patent Documents 2 and 3 require a surface treatment using a rare metal including nickel and cobalt. In recent years, a high-temperature heat may be loaded on copper foils used in not only negative electrode current collector application of non-aqueous secondary batteries such as lithium ion secondary batteries but also applications including printed wiring boards and the others. Also in these applications, reduction of the mechanical strength after the heat treatment of the copper foil is not preferable since such property may cause various problems. So, an object of the present invention is to provide a copper foil inexpensive and sufficient in tensile strength also after a high-temperature heat loading, and a negative electrode current collector and a negative electrode material of a non-aqueous secondary battery using the copper foil.

Means to Solve the Problem

As a result of intensive studies, the present inventors have thought out a copper foil inexpensive and sufficient in tensile strength even after a high-temperature heat loading by employing the following technical concept.

The copper foil according to the present invention is a copper foil including zinc in a content range of 0.02% by mass to 2.7% by mass in the total mass of the entire copper foil, and if the regions in thicknesses direction from both surfaces of the copper foil where occupies 5% by mass in the total mass of the entire copper foil are referred to as the respective external layers and a region between one external layer and the other external layer is referred to as an internal layer, the internal layer comprises copper as a main element and includes 100 ppm or more of one or mixture of small amount-elements selected from carbon, sulfur, chlorine and nitrogen, and includes zinc at 10% or more in the total mass of zinc included in the entire copper foil.

In the copper foil according to the present invention, the grain size of copper in the internal layer is preferable to be 1.0 micron-meters or less.

In the copper foil according to the present invention, it is preferable that the external layer of the copper foil has a concentrated zinc-layer higher in zinc content than the rest regions and occupying a part in the external layer.

In the copper foil according to the present invention, it is preferable that a compound composed of zinc and one or mixture of elements selected from carbon, sulfur, chlorine and nitrogen precipitates at a grain boundary of copper in the internal layer.

The copper foil according to the present invention has a mechanical property, a tensile strength of 40 kgf/mm² or more.

The negative electrode current collector according to the present invention uses the copper foil according to the present invention.

The negative electrode material of a non-aqueous secondary battery according to the present invention uses the negative electrode current collector according to the present invention.

Advantages of the Invention

The copper foil according to the present invention includes zinc in a content range of 0.02% by mass to 2.7% by mass in the total mass of the entire copper foil; the internal layer comprises copper as a main element and includes 100 ppm or more of one or mixture of small amount-elements selected from carbon, sulfur, chlorine and nitrogen, and includes zinc at 10% or more in the total mass of zinc included in the entire copper foil. Zinc included in the internal layer forms compounds with the small amount-elements to make grains miniature. The miniature grains are maintained even after a high-temperature heat loading. So, the copper foil according to the present invention can be manufactured inexpensively and sufficient in tensile strength since a zinc alloy is employed.

PREFERRED EMBODIMENTS OF THE INVENTION

Embodiments of the copper foil, the negative electrode current collector and the negative electrode material for a non-aqueous secondary battery according to the present invention will be described one by one.

<Embodiment of the Copper Foil According to the Present Invention>

1. Copper Foil

Embodiment of the copper foil according to the present invention will be described. The copper foil will be described mainly as an example used as a negative electrode current collector of a non-aqueous secondary battery such as a lithium ion secondary battery. However the copper foil according to the present invention is sure to be used as a raw material for manufacturing of not only negative electrode current collectors of non-aqueous secondary batteries such as lithium ion secondary batteries but also printed wiring boards.

The copper foil according to the present invention is a copper foil including zinc in a content range of 0.02% by mass to 2.7% by mass in the total mass of the entire copper foil and if the regions in thicknesses direction from both surfaces of the copper foil where occupies 5% by mass in the total mass of the entire copper foil are referred to as the respective external layers, a region between one external layer and the other external layer is referred to as an internal layer; and the internal layer comprises copper as a main element and includes 100 ppm or more of one or mixture of small amount-elements selected from carbon, sulfur, chlorine and nitrogen, and includes zinc at 10% or more in the total mass of zinc included in the entire copper foil. In the present invention, the co-inclusion of zinc and the small amount-elements in the above-mentioned ranges, and the zinc amount in the entire internal layer of 10% or more in the total mass of zinc included in the entire copper foil make a compound composed of zinc and the small amount-element precipitate at grain boundaries. The copper foil according to the present invention including the compounds is miniaturized a grain structure of the copper foil to make the copper foil excellent in the mechanical properties including tensile strength. Further, if the copper foil is used as a raw material of products including negative electrode current collector of lithium ion secondary batteries manufactured in the process including high temperature heat treatment, grain growth is hindered by contaminated compounds to maintain the minute grains even after a high-temperature heat loading. So, the copper foil according to the present invention can be manufactured inexpensively and sufficient in tensile strength since a zinc alloy is utilized.

Constitution of each layer will be described, and then, zinc/tin content in the copper foil will be described.

(1) Definition of the External Layer and the Internal Layer

Figure 1:
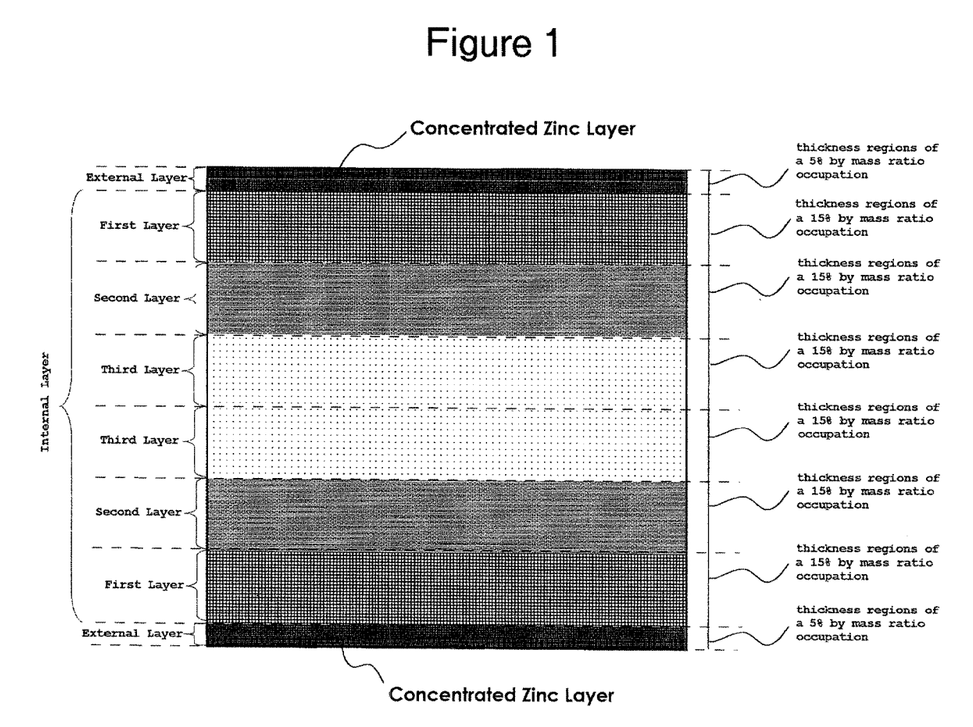
FIG. 1 is a schematic diagram demonstrating divided layers including the internal layer and the external layers, and zinc contents in the layers of the copper foil according to the present invention.

First, the definitions of the external layer and the internal layer will be described. In the present invention, the regions in thicknesses direction from both surfaces of the copper foil where occupies 5% by mass in the total mass of the entire copper foil are referred to as the respective external layers, and a region between one external layer and the other external layer is referred to as an internal layer as shown in FIG. 1. In the present invention, the external layers and the internal layer are the divided layers along the thickness direction of the copper foil for convenience depending on the mass ratio of zinc, and are not physically independent layers exist in the copper foil according to the present invention. In the present application, the internal layer is further divided into thickness regions of a 15% by mass, and the regions are referred to as a first layer, a second layer and a third layer in the order from sides nearest the external layers for convenience to demonstrate the distribution of zinc in the depth direction of the internal layer. Note that as FIG. 1 is a schematic diagram to make understanding of the layer structure easy, the thickness of each layer is not limited as shown in the figure. Further in FIG. 1, although different hatches are attached on each layer, no correlation between the hatch concentration and the zinc content in each layer. Hereinafter, elements constituting each layer will be described, and then the distribution of zinc in the depth direction of the copper foil will be described.

(2) External Layers

The external layers are the regions corresponding to a thickness occupying 5% by mass in the total mass of the entire copper foil from the surface of the copper foil (see FIG. 1). The external layer may be provided with a concentrated zinc-layer described later.

(3) Concentrated Zinc-Layer

In the present invention, a concentrated zinc-layer occupies a part in the external layer, and is a region where the zinc content is higher in an external layer of the copper foil than in the rest region. The copper foil according to the present invention contains zinc in the range of 0.02% by mass to 2.7% by mass against the total mass of the entire copper foil as described above. Provision of the concentrated zinc-layer in the external layer hinders oxidation of the copper foil surface to result improved oxidation resistance on the copper foil.

Figure 2:
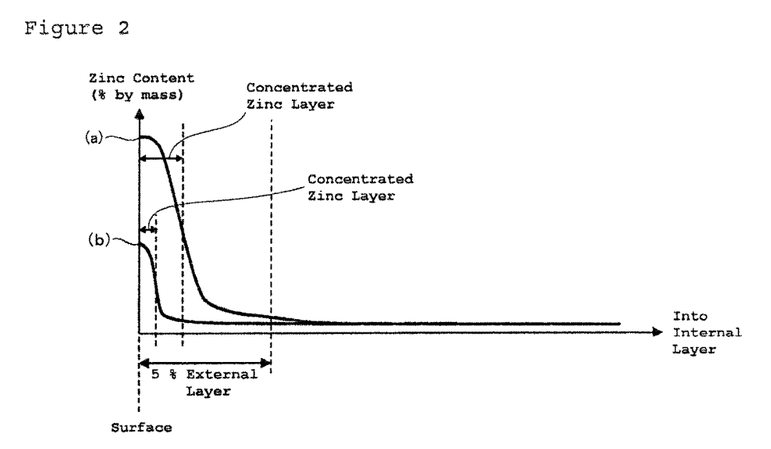
FIG. 2 is a graph showing distribution of zinc content in the external layer along thickness direction of the copper foil according to the present invention.

The concentrated zinc-layer will be described in more detail with reference to FIG. 2. FIG. 2 is a graph schematically showing distribution of zinc content in the depth direction of copper foils (Sample (a) and Sample (b)) according to the present invention. Although Sample (a) and Sample (b) have different distribution of zinc content in the copper foils, the zinc content is high in the surface side and low in the internal layer. Note that FIG. 2 simply shows the distribution of zinc content, and exemplifies models where the zinc content in the internal layer is uniform. In the present invention, this model of the concentrated zinc-layer can be defined as follows for example. First, a curve indicating a distribution of zinc content in the depth direction of the copper foil is expressed by a functional expression ($f(x)=y$; here, x indicates a depth (position)). Then, determine a position (depth position) where the first derivative ($f'(x)=y'$) indicates a minimum value and the sign of its second derivative ($f''(x)=y''$) changes, i.e. an inflection point where the first derivative indicates a minimum value. In the present invention, a region from the surface of the copper foil to a depth position (x) of the inflection point can be referred to as a concentrated zinc-layer. Note that as existence of a region having a higher zinc content than rest regions in the external layer of the copper foil should be just confirmed in the present invention, accurately determined region occupied by a concentrated zinc-layer in the external layer by the means described above is not necessary. As distributions of zinc contents are just exemplified in FIG. 2, distribution of zinc content in the depth direction of the copper foil according to the present invention is not limited to the graph shown in FIG. 2.

As described above, the concentrated zinc-layer is a region determined based on a distribution of zinc content in the depth direction of a copper foil; and if the zinc content in the region is higher than that in the rest region, the region may include other elements. The concentrated zinc-layer may include copper and/or the small amount-elements as elements other than zinc, for example. Further as the copper foil may include tin in this model and the concentrated zinc-layer may include tin. Tin will be described later.

(4) Internal Layer

The internal layer will be described. The internal layer contains copper as a main element, and contains 100 ppm or more of one or mixture of small amount-elements selected from carbon, sulfur, chlorine and nitrogen as described above. Note that although the internal layer contains zinc and optional element of tin, the contents and the distributions of zinc and tin will be described in another paragraph.

Small amount-elements: the contents of small amount-elements included in the internal layer will be described. The internal layer contains 100 ppm or more of the small amount-elements described above and is preferable that the internal layer contains carbon in the range of 20 ppm to 470 ppm, sulfur in the range of 5 ppm to 600 ppm, chlorine in the range of 15 ppm to 600 ppm and nitrogen in the range of 5 ppm to 600 ppm in the present invention from the viewpoints described below.

Carbon content included in the internal layer of less than 20 ppm is not preferable since formation of graphite contributes to enhancement of the grain structure strength of the internal layer is insufficient and makes strength enhancement difficult. In contrast, carbon content included in the internal layer of exceeding 470 ppm is not preferable since the graphite grows coarse and cracks tend to generate.

Sulfur content included in the internal layer of less than 5 ppm is not preferable since miniaturization (for example, 1.0 micron-meters or less) of the grain size of copper constituting the internal layer is made hard, and a copper foil having a high tensile strength cannot be manufactured. In contrast, the sulfur content included in the internal layer of exceeding 600 ppm is not preferable since although tensile strength of the copper foil is made high, but decreased elongation makes the copper foil brittle.

Chlorine content included in the internal layer of less than 15 ppm is not preferable since formation of chlorides contribute to enhancement of the copper foil texture structure strength is made insufficient and makes strength enhancement difficult. In contrast, chlorine content included in the internal layer of exceeding 600 ppm is not preferable since deposit side surface of an electro-deposited copper foil is made rough and adhesion of a negative electrode active substance on the surface without deviation is made hard. As a result, in-plane volume change in repeated charging/discharging is made not uniform to result local breaks. Note that, the unit "ppm" used for indication of the content of these small amount-elements is the same meaning as "mg/kg."

Nitrogen content included in the internal layer of less than 5 ppm is not preferable since formation of nitrogen compounds contribute to enhancement of the grain structure strength of the internal layer is made insufficient and makes strength enhancement difficult. In contrast, nitrogen content included in the internal layer of exceeding 600 ppm is not preferable since nitrogen compounds is made excessive and the strength enhancement effect on the deposit structure of a copper foil is saturated and significance of increasing the nitrogen content is lost.

Grain size: diameter of grains (referred to as "grain size" in the present specification) constituting the grain structure of the internal layer will be described. The grain size is preferable to be 1.0 micron-meter or less, more preferable to be 0.8 micron-meters or less, and furthermore preferable to be 0.5 micron-meters or less. The grain size of exceeding 1.0 micron-meter is not preferable since it is difficult to maintain a tensile strength (for example, 40 kgf/mm$^2$ or more) in a level required on a negative electrode current collector of a non-aqueous secondary battery such as a lithium ion secondary battery. So, the grain size is preferable to be 1.0 micron-meter or less from the viewpoint of achieving a tensile strength in a level required in the market. The grains constituting the internal layer are preferable to be not only fine but also uniform. The uniform grains make a load applied on the foil disperse without concentration on specific grains and contribute to the strength enhancement. Note that, the grain size can be an average value of grain sizes determined from the grain diameters of grains present in a prescribed measurement visual field. In addition, whether the grains are uniform or not may be determined from the standard deviation among grain diameters of individual grains present in the measured visual field.

Although the internal layer can be formed by using an electro-deposited copper foil or a rolled copper foil which includes the small amount-elements, the internal layer is more preferable to be a layer formed by using an electro-deposited copper foil which includes the small amount-elements from the viewpoint of easy provision of a grain structure of fine grains as described later.

Thickness of the internal layer is not especially limited, and may be suitably arranged to an appropriate thickness depending on applications of the copper foil. For example, if the copper foil is used as a negative electrode current collector of a non-aqueous secondary battery such as a lithium ion secondary battery, thickness of the internal layer may be in the range of 5 micron-meters to 35 micron-meters (in terms of gauge thickness). If the copper foil is used for manufacturing of a printed wiring board, the thickness of the internal layer may be in the range of 5 micron-meters to 120 micron-meters (in terms of gauge thickness). Even if the copper foil according to the present invention is a thin copper foil of 5 micron-meters to 35 micron-meters, the copper foil has a tensile strength in a level required in the market as a negative electrode current collector of a lithium ion secondary battery. Specifically, the copper foil according to the present invention has a tensile strength of 40 $kgf/mm^2$ or more, which is required in the market, a tensile strength of 50 $kgf/mm^2$ or more is preferable, and a tensile strength of 70 $kgf/mm^2$ or more is more preferable.

(5) Zinc Content and Distribution of Zinc in the Copper Foil

Zinc content and distribution of zinc in the copper foil will be described. Zinc content in the copper foil will be first described. The copper foil includes zinc in the range of 0.02% by mass to 2.7% by mass in the total mass of the entire copper foil.

Zinc content of less than 0.02% by mass in the total mass of the entire copper foil is not preferable since even if zinc is included in the range described above in the internal layer, the amount of compound composed of zinc and the small amount-element is made insufficient since the amount of zinc included in the internal layer is small and the effect of achieving miniaturization of grains, or the effect of maintaining fine grains cannot sufficiently be provided. In contrast, zinc content of exceeding 2.7% by mass in the total mass of the entire copper foil is not preferable since the effect to hinder decrease in tensile strength after heat treatment is saturated and results waste of the resource.

The copper foil includes zinc in the content range described above, and the internal layer includes zinc at 10% or more in the total mass of zinc included in the entire copper foil in the present invention.

A compound composed of zinc and the small amount-element in an amount enough to achieve the effect described above may precipitate at grain boundaries in the present invention by making zinc distribute not only in the external layer provided with a concentrated zinc-layer but also in the internal layer without concentrated zinc-layer at 10% or more in the total mass of zinc included in the entire copper foil. The amount of zinc included in the internal layer of less than 10% in the total mass of zinc included in the entire copper foil is not preferable since the effect of achieving miniaturization of grains and the effect of maintaining fine grains cannot be provided because of small amount of zinc included in the internal layer and for the same reason as described above, even if the zinc content is in the range described above in the total mass of the entire copper foil. To achieve the advantages of the present invention, the amount of zinc included in the internal layer in the total mass of zinc included in the entire copper foil is preferable to be 20% or more, more preferable to be 30% or more, and furthermore preferable to be 35% or more.

The uniform distribution of zinc included in the internal layer is more preferable. As shown in FIG. 1, if the internal layer is virtually divided into a first layer, a second layer and a third layer, it is preferable that the contents of zinc in the layers are equal. Also, the contents of zinc uniform in each layer is more preferable. However, making of the zinc contents included in the internal layer uniform is commercially disadvantageous from the viewpoint of the manufacturing method. Means to uniformly distribute zinc in an internal layer include a method of carrying out heat treatment at a high temperature for a longer time in a zinc diffusion step in a manufacturing method described later. However, as the infinite time is theoretically necessary in this model to make the distribution of zinc included in the internal layer uniform, such method is unrealistic. Another means includes a method using an alloy ingot of zinc, copper and the small amount-elements described above and rolling-processed into a foil. However, process steps increase cost in the method. Alternatively, although the method of manufacturing a copper zinc alloy foil by electrolysis may be considerable, no commercially effective method has been developed by now.

If the zinc content of the copper foil satisfies the range described above and the zinc content in the internal layer satisfies the range described above, the zinc content included in the internal layer may gradually decrease from the first layer to the third layer. In this model, the copper foil according to the present invention can easily be manufactured by a manufacturing method described later, and the model is commercially advantageous.

(6) Tin Content and Distribution of Tin in the Copper Foil

As described above, the copper foil according to the present invention is preferable to include a small amount of tin in addition to zinc and the small amount-elements described above. Inclusion of tin makes the function as a rust-proofing layer of the concentrated zinc-layer improve, and makes the mechanical property such as tensile strength of the copper foil further enhanced. In this model, the copper foil is preferable to contain tin in the range of 0.01% by mass to 0.60% by mass in the total mass of the entire copper foil. In the model, the external layers are preferable to include tin at 10% to 60% in the total mass of tin included in the entire copper foil, and the internal layer is preferable to include tin of 50% or more in the total mass of tin included in the entire copper foil. The amount of tin included in the internal layer which is made 50% or more in the total mass of tin included in the entire copper foil achieves both the miniaturization effect of grains and hinderance effect of grains growth by the heat loading. So, tensile strength does not decrease even after high-temperature heat loading, i.e. the copper foil might be further excellent in the mechanical property.

(7) Others

The copper foil according to the present invention may be optionally provided with other surface treatment layers such as a roughening treatment layer, a chromate treatment layer and an organic agent treatment layer according to needs in addition to the concentrated zinc-layer.

If a roughening treatment layer is provided, adhesion between the surface of the copper foil and a negative electrode mixture is enhanced if the copper foil is used as a negative electrode current collector of a lithium ion secondary battery.

If a chromate treatment layer and/or an organic agent treatment layer is provided, these layers further hinder the oxidation of the copper foil surface together with the concentrated zinc-layer and further enhance adhesion with the negative electrode active substance of the lithium ion secondary battery. Note that, the organic agent treatment layer includes a silane coupling agent treatment layer and an organic rust-proofing treatment layer.

2. Manufacturing Method of the Copper Foil According to the Present Invention

Manufacturing method of the copper foil according to the present invention will be exemplified. In the following, manufacturing method of the copper foil according to the present invention, subjecting the surface of a raw copper foil to a surface treatment using zinc followed by heat treatment will be described. Note that the copper foil according to the present invention is not limited to the copper foil manufactured by the following manufacturing method, and include any copper foils as long as constituting elements of the copper foils, the content of each element and the distribution of each element in the copper foils are in the ranges described above. Hereinafter, the manufacturing method will be described step by step.

(1) Preparation of a Copper Foil Layer

Content of the small amount-elements: a copper foil layer for manufacturing of the copper foil according to the present invention is prepared first by employing an untreated copper foil without a surface treatment layer using zinc described later as a raw copper foil. Also for a raw copper foil for preparation of the copper foil layer, the total content of the small amount-elements described above and the content of each element are preferable to be in the ranges (in the ranges of the small amount-elements described on the internal layer) described above for the same reason.

Zinc content: the copper foil according to the present invention includes a small amount of zinc in the internal layer as described above. However, a manufacturing method described later employs a method in which zinc diffuses from zinc deposition layer provided on the surface of the copper foil layer into the copper foil layer by heat treatment in a zinc diffusion step described later. So, the raw copper foil for manufacturing is not required to include zinc.

Although the raw copper foil for manufacturing may be any of a rolled copper foil and an electro-deposited copper foil, but an electro-deposited copper foil is preferable from the viewpoint that the grain size is fine. The grain size as received (before heat treatment) of 0.8 micron-meters or less is more preferable. In the manufacturing method, a high-temperature heat is loaded on the copper foil layer in a zinc diffusion step described later. In the zinc diffusion step, the smaller the grain as received of a copper foil layer, the more the fine grain (for example 1.0 micron-meters or less) may be maintained. Note that the raw copper foil for manufacturing is not especially limited as long as the copper foil after finishing the zinc diffusion step satisfies the requirements described above which the copper foil according to the present invention should satisfy.

(2) Roughening Treatment Step

If a roughening treatment layer is provided on the surface of the copper foil layer, the surface of the raw copper foil is subjected to a roughening treatment. The roughening treatment layer has an optional layer structure of the present invention, and a roughening treatment method and a roughening treatment condition are not especially limited. It is natural that the raw copper foil surface may be subjected to a pretreatment including an acid pickling treatment before the roughening treatment. Note that, as the roughening treatment method and the roughening treatment condition are not limited as described above, appropriate methods among the conventional well-known methods may suitably be employed depending on requirement for the surface performance of the copper foil.

(3) Zinc Deposition Step

Then, the surface of the copper foil layer is subjected to zinc deposition in which zinc or a zinc alloy is provided on the surface to form zinc deposition layer. Note that, the zinc refers to zinc of 99% or more in purity. The zinc alloy includes a mixture, solid solution, eutectic, compound of zinc with other elements. If a zinc alloy layer composed of a zinc alloy is formed as zinc deposition layer on the surface of the copper foil layer, a zinc-tin alloy layer is particularly preferable. In this model, in place of the zinc-tin alloy layer, a tin layer may be formed on the surface of the zinc layer after finishing formation of a zinc layer. In either model, it is preferable to provide zinc or a zinc alloy on the surface(s) to make the amount of zinc on one surface or on both the surfaces is made in the range of 30 mg/m$^2$ to 2,200 mg/m$^2$, for example on a 12 micron-meters thick copper foil (copper foil layer). If a zinc alloy provided on one surface or both surfaces of a copper foil layer is made the amount of zinc in the range, zinc may be included in the range of 0.02% by mass to 2.7% by mass in the total mass of the entire copper foil, and the amount of zinc included in the internal layer after finishing the zinc diffusion step described later may be 10% or more in the total mass of zinc included in the entire copper foil.

In the zinc deposition, any method may be used as long as zinc or a zinc alloy is provided on the surface of the copper foil layer; and electrochemical means such as electro-plating or electroless plating, or physical deposition means such as sputtering deposition or chemical vapor deposition may be used for example. However, in consideration of the production cost, electrochemical means is preferable to be employed.

Electro-plating method: if zinc deposition layer composed of zinc is formed on the surface of a copper foil layer by an electro-plating method, plating bathes including a zinc pyrophosphate plating bath, a zinc cyanide plating bath and a zinc sulfate plating bath may be used as zinc plating solution. For example, if a zinc pyrophosphate plating bath is employed, zinc deposition layer composed of zinc can be provided on the surface of a copper foil layer by employing a bath composition; a zinc concentration of 5 g/l to 30 g/l, a potassium pyrophosphate concentration of 50 g/l to 500 g/l and pH of 9 to 12, and solution temperature of 20 deg.-C. to 50 deg.-C., and electrolysis with a current density of 0.3 A/dm$^2$ to 10 A/dm$^2$ by cathodically polarizing the copper foil layer.

(4) Chromate Treatment

The surface of the zinc deposition layer may optionally be subjected to a chromate treatment. Although the chromate treatment includes an electrolytic chromate treatment and an electro-less chromate treatment, either method may be applicable. However, an electrolytic chromate treatment is preferable to be employed in consideration of the thickness deviation in a chromate film and stable amount of deposition. The electrolytic condition in the electrolytic chromate treatment is not especially limited, and an appropriate condition may suitably be employed.

(5) Organic Agent Treatment

The surface of the zinc deposition layer may be subjected to an organic agent treatment. The organic agent treatments include a silane coupling agent treatment and an organic rust-proofing treatment.

Silane coupling agent treatment: in the present invention, a silane coupling agent treatment is not indispensable; and the treatment is optionally carried out in consideration of the adhesion of the copper foil with an insulating resin base material or a negative electrode mixture for a lithium ion secondary battery, and an appropriate condition and method may be suitably employed.

Organic rust-proofing treatment: if an organic rust-proofing treatment is carried out to further improve the rust-proofing effect, a surface treatment using an organic agent, benzotriazoles including methylbenzotriazole (tolyltriazole), aminobenzotriazole, carboxylbenzotriazole and benzotriazole may be carried out, for example. Alternatively, other organic agents including aliphatic carboxylic acids, alkylamines, benzoic acids, imidazoles, triazinethiols may be used. The organic rust-proofing treatment is not especially limited also, and an appropriate condition and method may be suitably employed.

(6) Drying Step

After finishing various surface treatments on the copper foil layer in addition to the zinc deposition according to needs, the copper foil is subjected to a drying step to make the wet copper foil while passing the various surface treatment steps dry. The drying condition is not especially limited. However, if an organic agent treatment is carried out, heating is preferable to be carried out at a temperature of 100 deg.-C. to 250 deg.-C. for 2 seconds to 10 seconds since the thermal decomposition of a silane coupling agent and/or an organic rust-proofing agent provided on the surface of the copper foil should be prevented and these chemicals should be fixed in a good condition on the copper foil surface.

(7) Zinc Diffusion Step

Zinc diffusion step will be described. Zinc diffusion step is a step where the copper foil after finishing a drying step is high-temperature heat treated to diffuse zinc from the zinc deposition layer into the copper foil layer to finish the copper foil according to the present invention.

Zinc diffusion condition: zinc diffusion temperature for diffusing zinc is preferable to be in the range of 250 deg.-C. to 400 deg.-C., and more preferable to be in the range of 300 deg.-C. to 350 deg.-C. Although time for diffusion of the zinc depends on the zinc diffusion temperature, 1 hour to 8 hours is preferable, and 1 hour to 4 hours is more preferable. After carrying out the heat treatment at the temperature range for the diffusing time described above, 10% or more of zinc in the total mass of zinc included in the zinc deposition layer may diffuse into the internal layer. If the zinc diffusion temperature and/or the zinc diffusion time is less than the lower limit in the specific range, the amount of zinc diffuse from the zinc deposition layer into the copper foil layer may be small to fail finishing of the copper foil according to the present invention. In contrast, if the zinc diffusion temperature and/or the zinc diffusion time exceeds the upper limit of the specific range, zinc diffusion may be saturated, and moreover, excessive heating may possibly cause softening of the copper foil layer. So, the heat treatment exceeding the upper limit does not need to be carried out.

The zinc diffusion step is not necessary be carried out following to the drying step, and may be carried out later as an optional step. That is, if the copper foil layer is used as a raw material for manufacturing of a product for which a high-temperature heat treatment step is included in the manufacturing step, the copper foil layer after finishing the drying step may be used as a primary raw material for a prescribed application. Then, by carrying out heat treatment step in the manufacturing step of the customer's product as the zinc diffusion step, the copper foil according to the present invention can be manufactured by diffusing zinc included in zinc deposition layer into the copper foil (copper foil layer) in the manufacturing step of the product. Specifically, if the copper foil according to the present invention is used as a negative electrode current collector of a lithium ion secondary battery, the copper foil after finishing the drying step may be used as a primary material for the negative electrode current collector. Then, heat treatment step for providing a negative electrode mixture on the surface of a negative electrode current collector can be assumed to be the zinc diffusion step. That is, the copper foil according to the present invention can be finished in a process for manufacturing a negative electrode material by diffusing zinc included in zinc deposition layer into the copper foil (copper foil layer). The matter is also the same in the copper foil as a raw material for manufacturing of a printed wiring board. A copper foil (copper foil layer) provided with zinc deposition layer on the surface is laminated on a resin base material, and a high-temperature hot pressing may be assumed to be the zinc diffusion step, and zinc included in the zinc deposition layer diffuses into the copper foil layer and the copper foil according to the present invention is finished.

<Embodiment of the Negative Electrode Current Collector According to the Present Invention>

Embodiment of the negative electrode current collector according to the present invention will be described. The negative electrode current collector according to the present invention uses the copper foil according to the present invention described above, and can be used as a terminal which output a current outside of a primary battery and a secondary battery; and can be used as a negative electrode current collector contact to a negative electrode mixture inside a battery. The negative electrode current collector according to the present invention is not especially limited except for using the copper foil according to the present invention. The negative electrode current collector according to the present invention is excellent in the mechanical property such as tensile strength since the copper foil according to the present invention is used. If a concentrated zinc-layer is further provided on the surface of the copper foil according to the present invention, the negative electrode current collector is made excellent in the corrosion resistance.

<Embodiment of the Negative Electrode Material of a Non-Aqueous Secondary Battery According to the Present Invention>

Embodiment of the negative electrode material of a non-aqueous secondary battery according to the present invention will be described. Note that, the words "a non-aqueous secondary battery" is a general term of secondary batteries using an electrolyte other than an aqueous solution, and includes secondary batteries using an organic electrolytic solution, a polymer gel electrolyte, a solid electrolyte, a polymer electrolyte or a fused salt electrolyte. The negative electrode material according to the present invention is not especially limited the form as long as which use the negative electrode current collector according to the present invention. For example, the negative electrode material may have construction where a negative electrode mixture layer is provided on the surface of the negative electrode current collector such as a negative electrode material of a lithium ion secondary battery. In this model, the negative electrode mixture layer may be composed of a negative electrode active substance, a conductive agent and a binder.

As described above, the copper foil according to the present invention is excellent in the corrosion resistance, and has a tensile strength of 40 kgf/mm$^2$ after a high-temperature heat loading. So, even if repeated stress is applied on the negative electrode current collector by repeated charging/discharging cycle in a lithium ion secondary battery, risk of deformation such as wrinkles or breaks in the negative electrode current collector is less, and the electric performance of the lithium ion secondary battery may be maintained. Although, a high-temperature heat is applied on the negative electrode current collector in a step for providing a negative electrode mixture layer on the surface of a negative electrode current collector in manufacturing of a negative electrode material of a lithium ion secondary battery, tensile strength is enough.

Hereinafter, copper foils according to the present invention will be described specifically with reference to Examples and Comparative Examples, but the present invention is not limited to the Examples described later.

EXAMPLES

Example 1

In Example 1, a copper foil according to the present invention was manufactured, and compared with Comparative Example 1 described later. The procedure will be described step by step.
Preparation of a copper foil layer: in preparation of a copper foil layer, an electro-deposited copper foil including a small amount elements of 100 ppm or more in total was used. Specifically, an electro-deposited copper foil without surface treatment of 12 micron-meters thick used for manufacturing of VLP copper foils of Mitsui Mining & Smelting Co., Ltd. was used.
Zinc deposition step: in Example 1, zinc deposition layer composed of zinc layer including zinc or a zinc-tin alloy layer including a zinc-tin alloy was provided as zinc deposition layer on both surfaces of the copper foil layer. Providing method of zinc deposition layer will be described.
In Example 1, zinc layers were provided on both surfaces of the copper foil layer by using a zinc pyrophosphate plating bath. Specifically, a bath composition employed was zinc concentration of 6 g/l, potassium pyrophosphate concentration of 125 g/l and pH of 10.5. Using the zinc pyrophosphate plating bath of the composition, a copper foil named Specimen 1-1 was provided zinc at 50 mg/m$^2$ per surface on both surfaces by making the copper foil layer cathodically polarizing, the solution temperature of 30 deg.-C. and suitably regulating the current density and the electrolysis time.
Further in Example 1, zinc-tin alloy layers were provided on both surfaces of the copper foil layer by using a zinc-tin pyrophosphate plating bath. Specifically, a bath composition employed was zinc concentration of 1 g/l to 6 g/l, tin concentration of 1 g/l to 6 g/l, potassium pyrophosphate concentration of 100 g/l and pH of 10.6. Using the zinc pyrophosphate-tin plating bath of the composition, a copper foil named Specimen 1-2 was provided zinc at 250 mg/m$^2$ and tin at 15 mg/m$^2$ by making the prepared copper foil layer cathodically polarizing, the solution temperature of 30 deg.-C. and suitably regulating the current density and the electrolysis time.
Zinc diffusion step: Specimen 1-1 and Specimen 1-2 were subjected to heat treatment at 350 deg.-C. for 60 min to diffuse zinc included in the zinc deposition layers into the copper foil layer to finish copper foils according to the present invention. The respective copper foils finished were named Example Sample 1-1 and Example Sample 1-2.

Example 2

Example 2 will be described. In Example 2, different type of copper foil according to the present invention was manufactured as follows. Procedure will be described step by step.
Preparation of the copper foil layer: the copper foil layer used in Example 2 was an electro-deposited copper foil prepared under the following condition. Sulfuric acid-based copper electrolytic solution was prepared by using a base solution adjusted at copper concentration of 80 g/l and free sulfuric acid concentration of 140 g/l as a sulfuric acid-base copper electrolytic solution followed by adding additives to adjust the concentrations of the additives as following. Concentration were sodium salt of mercapto-1-propanesulfonic acid of 60.0 ppm, diallyldimethylammonium chloride polymer (Unisence FPA100L, made by Senka Corp.) of 70.0 ppm, N,N'-diethylthiourea of 7.0 ppm and chloride of 60 ppm. The electro-deposited copper foil layer in Example 2 was prepared by using the sulfuric acid-based copper electrolytic solution. Hydrochloric acid was used for adjusting the chloride concentration. In preparation of the electro-deposited copper foil, a titanium plate whose surface was polished using a #2000 emery paper as a cathode and DSA as an anode are used to prepare the 15 micron-meters thick electro-deposited copper foil.
Zinc deposition step: in Example 2, zinc deposition layers were provided on both surfaces of the copper foil layer in the same manner as in Example 1 to prepare Specimen 2. Note that, the amount of zinc provided is 500 mg/m$^2$ per surface.
Zinc diffusion step: Specimen 2 provided with the zinc deposition layers was heat treated under the same condition as in Example 1 to diffuse the zinc included in zinc deposition layers into the copper foil layer to finish Example Sample 2.

Example 3

Example 3 will be described. In Example 3, further different type of copper foils according to the present invention were prepared as follows. Procedure will be described step by step.
Preparation of a copper foil layer: in Example 3, the copper foil layer used was the same as an electro-deposited copper foil prepared in Example 3 except using the sulfuric acid-based copper electrolytic solution described later in place of the sulfuric acid-based copper electrolytic solution used in Example 2. As a base solution for the sulfuric acid-based copper electrolytic solution, a copper sulfate solution adjusted copper concentration of 80 g/l and free sulfuric acid concentration of 140 g/l was used. The first sulfuric acid-based copper electrolytic solution was prepared by adding polyethyleneimine (Epomine, made by Nippon Shokubai Co., Ltd.) having a molecular weight of 10,000 to make polyethyleneimine concentration 52.8 mg/l. The second sulfuric acid-based copper electrolytic solution was prepared by adding polyethyleneimine having the same molecular weight and chloride to make polyethyleneimine concentration 52.8 mg/l and chloride concentration 2.2 mg/l. The third sulfuric acid-based copper electrolytic solution was prepared by adding polyethyleneimine having the same molecular weight to make polyethyleneimine concentration 80 mg/l. Then, electro-deposited copper foils were prepared using the first to third sulfuric acid-based copper electrolytic solutions to prepare Copper Foil layer 3-1 to Copper Foil layer 3-3.

Zinc deposition step: in Example 3, zinc deposition layers were provided on both surfaces of the electro-deposited copper foils (Copper Foil layer 3-1 to Copper Foil layer 3-3) in the same manner as in Example 1 and were named Specimen 3-1 to Specimen 3-3. Note that, the amount of zinc provided is 200 mg/m² per surface.

Zinc diffusion step: then, Specimen 3-1 to Specimen 3-3 provided with the zinc deposition layers were heat treated under the same condition as in Example 1 to diffuse zinc included in the zinc deposition layers into the copper foil layers to finish Example Sample 3-1 to Example Sample 3-3.

COMPARATIVE EXAMPLES

Comparative Example 1

In Comparative Example 1, a copper foil layer was manufactured by the same procedure as in the Example 1 without carrying out zinc deposition on the copper foil layer used in the Example 1, and named Comparative Sample 1.

Comparative Example 2

In Comparative Example 2, a copper foil layer satisfying the condition of "the total amount of small amount elements in the copper foil of less than 100 ppm" was selected and used.

Copper foil layer: as the copper foil layer having a total amount of small amount elements in the copper foil of less than 100 ppm, a commercially available oxygen-free rolled copper foil was used.

The sample prepared by subjecting a surface treatment on the electro-deposited copper foil in the same manner as for Example Sample 1-1 was named Comparative Sample 2-1. A sample prepared by subjecting a surface treatment on the untreated copper foil in the same manner as Comparative Sample 2-1 except for making the amount of zinc provided 500 mg/m² was named Comparative Sample 2-2. Further a sample prepared by subjecting a surface treatment on the electro-deposited copper foil in the same manner as for Example Sample 1-2 was named Comparative Sample 2-3.

Evaluations

1. Evaluation Methods

Evaluation items and measurement methods will be described.

Content of small amount-elements in a copper foil: contents of carbon and sulfur in an internal layer of a copper foil after finishing the zinc diffusion treatment were analyzed by using a carbon/sulfur analyzer EMIA-920V manufactured by Horiba, Ltd. Content of nitrogen was analyzed by using an oxygen/nitrogen analyzer EMGA-620 manufactured by Horiba, Ltd. Content of chloride was analyzed by using a solution after separation by acidolysis-silver bromide co-precipitation and using an ion chromatography system IC2001 manufactured by Tosoh Corp. Samples used in analysis of small amount-elements were prepared as follows. A sample for content analysis of carbon, sulfur and chloride in an internal layer was prepared by immersing a copper foil after finishing the zinc diffusion step in an etchant having a nitric acid concentration of 10% by volume and a hydrogen peroxide concentration of 5% by volume to etch 10% by mass of the copper foil in the total mass of the original sample. On the other hand, a sample for content analysis of the nitrogen in an internal layer was prepared by immersing a copper foil after finishing the zinc diffusion in an etchant having a hydrochloric acid concentration of 10% by volume and a hydrogen peroxide concentration of 5% by volume to etch 10% by mass of the copper foil in the total mass of the original sample.

Tensile strength: "tensile strength" in the present application refers to a measured value if a copper foil strip of 100 mm×10 mm (gauge length: 50 mm) was measured at a tensile rate of 50 ram/min in accordance with IPC-TM-650.

Distribution ratio and contents of zinc/tin: a copper foil after the heat treatment was used to measure the distribution ratios and the contents of zinc/tin included in an internal layer. Specifically, the measurement was carried out as follows. A copper foil after finishing the zinc diffusion step of 5 cm×5 cm was used as the original sample. The original sample was immersed in an etchant having a nitric acid concentration of 10% by volume and a hydrogen peroxide concentration of 5% by volume to etch 10% by mass in the total mass of the original sample, and the etched solution was named an external layer etched solution. By repeating the same procedure, the rest sample was etched by 30% by mass in the total mass of the original sample to obtain a first-layer etched solution, a second-layer etched solution, and a third-layer etched solution. The amounts of zinc/tin included in the external layer etched solution, the first-layer etched solution, the second-layer etched solution and the third-layer etched solution were quantitatively determined by ICP described above; and the zinc/tin contents included in each layer based on the measurement values were converted to respective mass ratios (% by mass) in the amounts of zinc/tin deposited. Based on the total value of the amounts of zinc/tin included in etched solution, the amounts of zinc/tin deposited were determined.

Measurement of the grain size: in the measurement of the grain size of a copper foil, an FE gun-type scanning electron microscope (SUPRA 55VP, manufactured by Carl Zeiss AG) equipped with an EBSD evaluation apparatus (OIM Analysis, manufactured by TSL Solutions KK), and attached EBSD analyzer were used. By using the apparatus, image data on a pattern of a cross-sectional crystal distribution on the copper foil being suitably cross-cut was obtained in accordance with EBSD method.

Then the image data was analyzed using an analysis menu in an EBSD analysis program (OIM Analysis, made by TSL Solutions KK) for conversion to the numeric average grain size. In the evaluation, the model where the misorientation of 5° or larger was assumed to be grain boundaries. The imaging condition of the scanning electron microscope was, acceleration voltage of 20 kV; aperture diameter of 60 mm; mode of High Current mode; and inclination angle of sample of 70°. Note that, the conditions including magnification, the measurement region and the step size were suitably changed in the measurements depending on the grain size.

Observation of a TEM image: in preparation of an observation sample for an image by TEM (transmission electron microscope), an ion milling apparatus (PIPS, made by Gatan, Inc.) was used. A specimen prepared using the apparatus was observed using a high-resolution transmission analysis electron microscope (EM-002BF) manufactured by Topcon Corp. with an acceleration voltage of 200 kV.

2. Evaluation Results (1) Comparison Between Example 1 and Comparative Example 1

Example 1 and Comparative Example 1 will be first compared with reference to Table 1. Table 1 shows tensile strength, contents of zinc/tin included in an internal layer, contents of each small amount-element in an internal layer and grain size of samples. As shown in Table 1, samples finished in Example 1 and Comparative Example 1 includes small amount-elements in the copper foil layer in the ranges specified in the present invention, but Comparative Sample 1 is not subjected to the zinc deposition. So, the zinc content included in the internal layer of Comparative Sample 1 is substantially 0% by mass, but is 55% by mass in Example Sample 1-1. Tensile strength of Comparative Sample 1 is less than 40 kgf/mm$^2$, tensile strength of Example Sample 1-1 and Example Sample 1-2 are 40 kgf/mm$^2$ or more. So, the matter is confirmed that the copper foil according to the present invention has tensile strength equal to or higher than the level required in the market including a negative electrode current collector of a lithium ion secondary battery.

In comparison between Example Sample 1-1 and Example Sample 1-2, Example Sample 1-2 which is higher in zinc content and includes tin is higher in tensile strength after heat treatment than the copper foil without heat treatment. That is, the matter is confirmed that tin further enhances mechanical property since tensile strength is higher.

Note that samples have been subjected to heat treatment at 350 deg.-C. for 60 min. As a tensile strength of Example Sample 1-1 and Example Sample 1-2 are nearly equal to or higher than that of the copper foil without heat treatment, the matter is confirmed that the reduction of the mechanical property by the heat treatment is hindered. It is because, Example Sample 1-1 and Example Sample 1-2 maintain fine grains as received since growth of the grains is hindered than that in Comparative Sample 1 although the grain size in the copper foil layer may be made large by the high-temperature heat treatment in the zinc diffusion step.

Then, the zinc/tin contents in the depth direction of the internal layer of samples will be investigated. As shown in Table 2, the matter is confirmed that although the contents of zinc in the first layer (see FIG. 1) closest to the external layer is higher than those in the second layer and the third layer, zinc is distributed in the second layer and the third layer also. So, the matter is confirmed that the heat treatment condition (in zinc diffusion step) employed in Example 1 enables zinc in the zinc deposition layer formed on the surface of the copper foil layer diffuse into the inside of the copper foil layer, inside of the internal layer, in a certain amount or more. As shown in Table 3, the matter is confirmed that carrying out of the zinc diffusion step makes tin diffuse from the zinc alloy layer formed on the surface of the copper foil layer into the internal layer also. Although the tin content in the third layer is higher than that in the second layer in Table 3, tin content in the third layer may not be high but tin might almost homogeneously diffuse into the middle portion of the internal layer in consideration of the quite small amount of deposited tin in the total mass of the entire copper foil and accuracy in handling for etching and analysis.

(2) Example 2

Example 2 will be investigated. Example Sample 2 is manufactured by using a copper foil (copper foil layer) different kind from those in Example Sample 1-1 and Example Sample 1-2. The matter is confirmed that Example Sample 2 is a copper foil excellent in the mechanical property having fine grains of average grain size of 0.31 micron-meters; and tensile strength of 67.5 kgf/mm$^2$.

(3) Example 3

Example 3 will be investigated. Example Sample 3-1 to Example Sample 3-3 manufactured by using copper foils (copper foil layers) prepared using the sulfuric acid-based copper electrolytic solutions including polyethylene-imine. Example Sample 3-1 to Example Sample 3-3 are confirmed to be copper foils having fine grains and excellent in mechanical property. Particularly, Example Sample 3-1 and Example Sample 3-3 are copper foils having an extremely fine grain structure of an average grain size of 0.25 micronmeters or less and very high in mechanical strength, tensile strength of 70 kgf/mm$^2$ or more.

(4) Comparison Between Example 1 and Comparative Example 2

Example 1 and Comparative Example 2 will be compared. The deposited amounts of zinc on the copper foil finished in Example Sample 1-1 and Comparative Sample 2-1 are the same. The content of zinc included in the internal layer of Comparative Sample 2-1 is 10% or more. However, Comparative Sample 2-1 is manufactured by using a copper foil layer in which total content of the small amount-elements is less than 100 ppm. Then, the matter is confirmed that even if the total zinc content in the copper foil and the zinc content included in the internal layer are in the ranges specified in the present invention, tensile strength is low if the content of the small amount-elements in the copper foil layer is less than 100 ppm, and is difficult to achieve the mechanical property required in the market.

(5) Grain Structure

Figure 3:
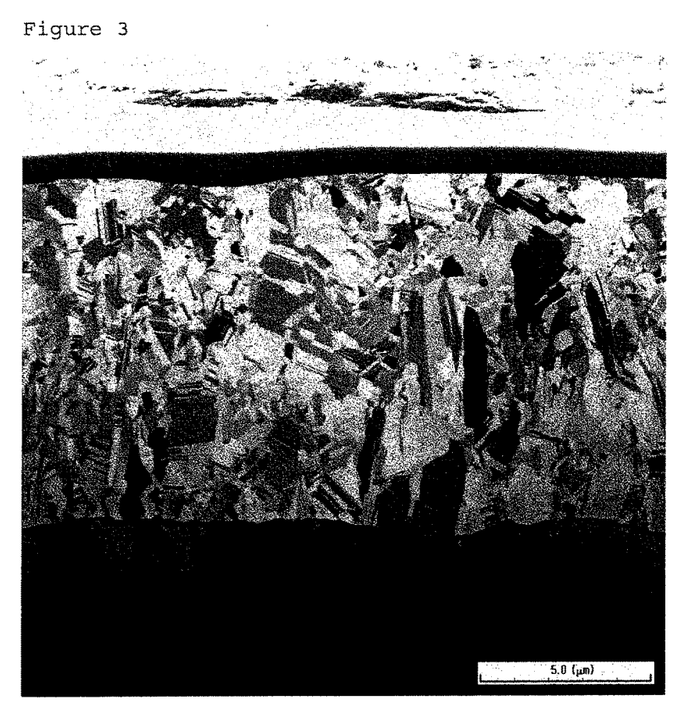
FIG. 3 is one FIB-SIM image showing a cross-sectional grain structure of a copper foil (Example Sample 1-1 in Example 1) according to the present invention.
Figure 4:
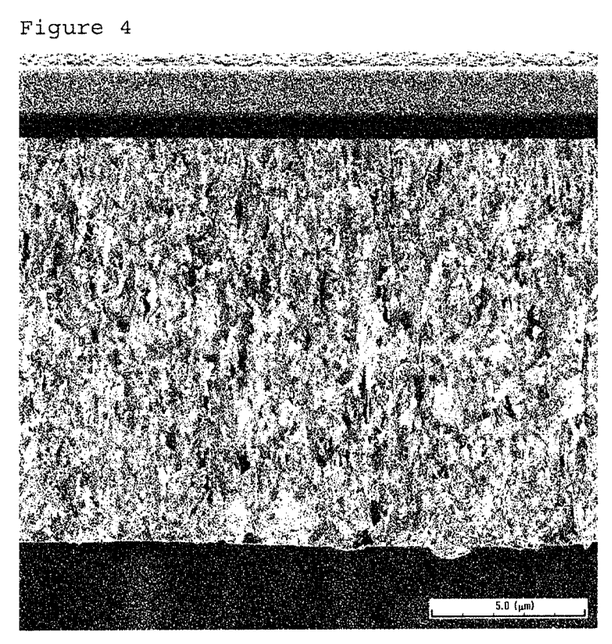
FIG. 4 is one FIB-SIM image showing a cross-sectional grain structure of a copper foil (Example Sample 3-1 in Example 3) according to the present invention.
Figure 5:
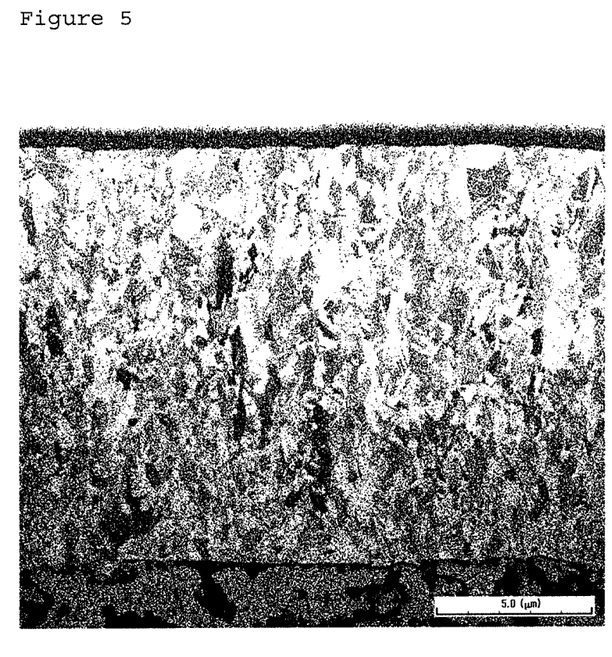
FIG. 5 is one FIB-SIM image showing a cross-sectional grain structure of a copper foil (Example Sample 3-2 in Example 3) according to the present invention.
Figure 6:
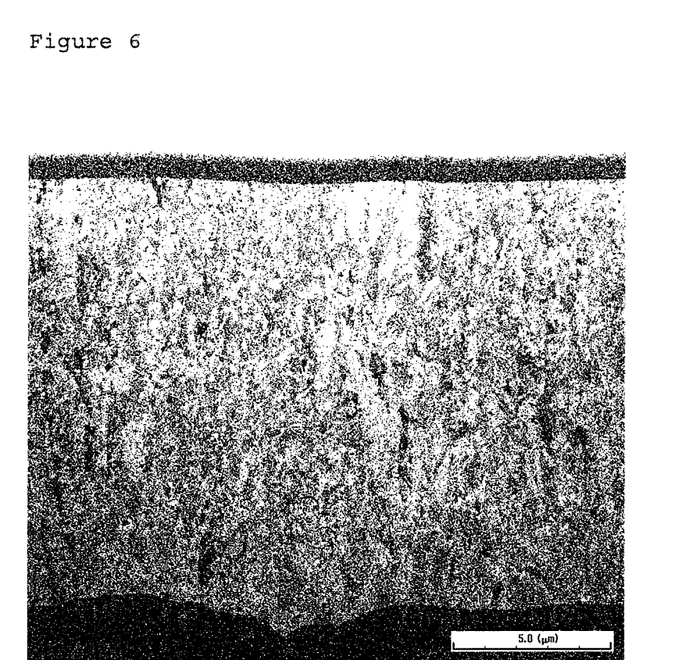
FIG. 6 is one FIB-SIM image showing a cross-sectional grain structure of a copper foil (Example Sample 3-3 in Example 3) according to the present invention.
Figure 7:
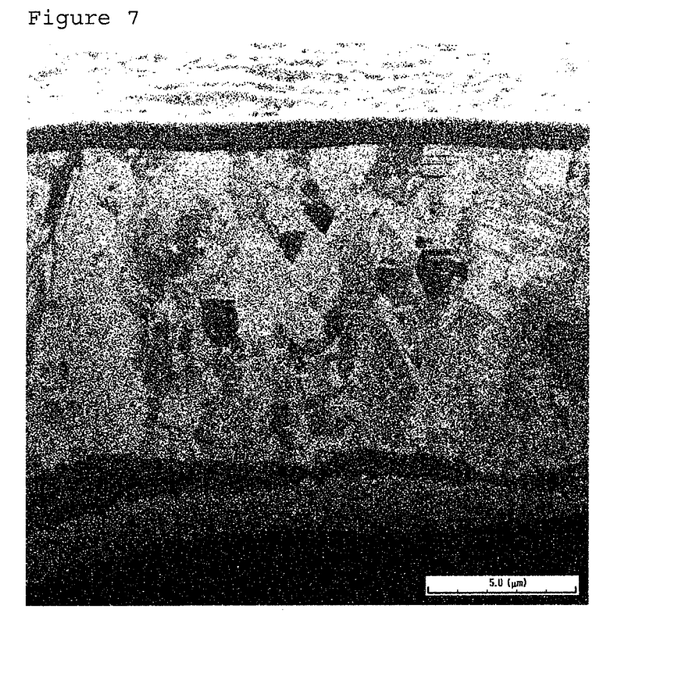
FIG. 7 is one FIB-SIM image showing a cross-sectional grain structure of Comparative Sample 1 of Comparative Example 1.
Figure 8:
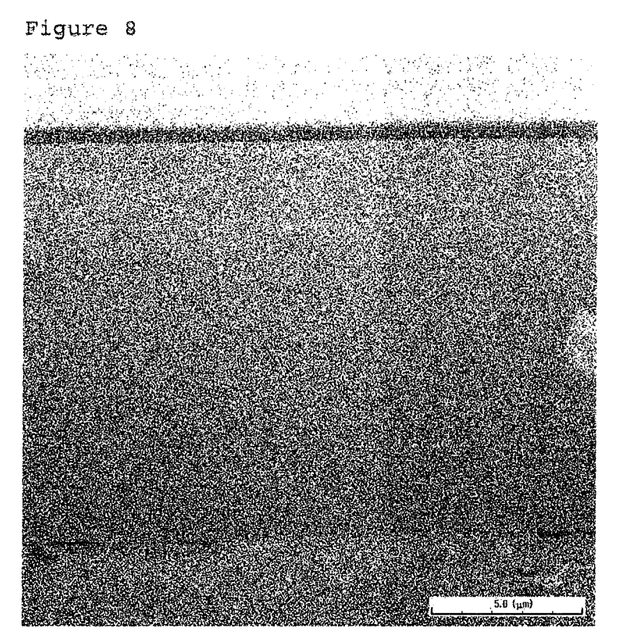
FIG. 8 is one FIB-SIM image showing a cross-sectional grain structure of Comparative Sample 2-1 of Comparative Example 2.

Grain structures in Example Samples and Comparative Samples will be compared with reference to FIG. 3 to FIG. 8. FIG. 3 is an FIB-SIM image showing a cross-sectional grain structure of Example Sample 1-1; and FIG. 4 to FIG. 6 are FIB-SIM images showing cross-sectional grain structures of Example Sample 3-1 to Example Sample 3-3. FIG. 7 is an FIB-SIM image showing a cross-sectional grain structure of Comparative Sample 1. FIG. 8 is an FIB-SIM image showing a cross-sectional grain structure of Comparative Sample 2-1. In FIG. 3 to FIG. 8, a region looks like a thin layer on the surfaces is vapor deposited carbon layer for preventing sagging of the surface in FIB processing, and have no relation with the embodiment of the copper foil according to the present invention. The matter is apparent in comparison among FIG. 3, FIG. 4 to FIG. 6 and FIG. 8 that the copper foil according to the present invention maintains fine grains even after heat treatment.

Figure 9:
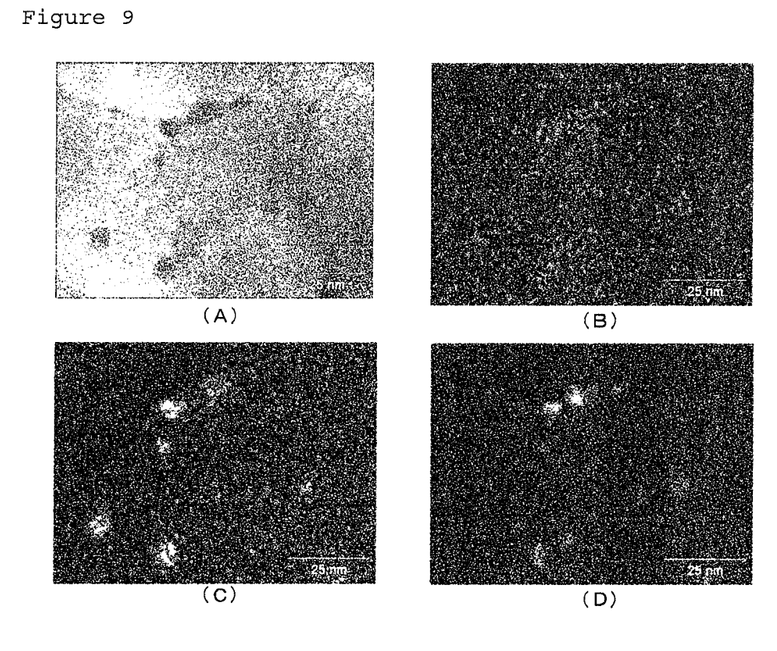
FIG. 9 is a TEM image and element mapping images showing a structure in Example 2.

Compound composed of zinc and the small amount-elements will be described with reference to FIG. 9. FIG. 9 is TEM observation images on Example Sample 2 including (A) showing an STEM-HAADF image and (B) to (D) showing element mapping images by EDX indicating sulfur, chlorine and zinc. In Example Sample 2, the matter is clearly confirmed from these mapping images that zinc included in the internal layer forms compounds with chloride and sulfur at the grain boundaries and hinders the growth of grains.

TABLE 3

| | Tin content (%) | | | |
|---|---|---|---|---|
| | | Internal layer | | Total Mass of Tin in |
| | External layer | First Layer | Second Layer | Third Layer | Entire Copper Foil (% by mass) |
| Example Sample 1-2 | 16 | 33 | 22 | 29 | 0.036 |
| Comparative Sample 2-3 | 87 | 6 | 2 | 5 | 0.017 |

INDUSTRIAL APPLICABILITY

The copper foil according to the present invention includes zinc in the range of 0.02% by mass to 2.7% by mass in the total mass of the entire copper foil; the internal layer contains copper as a main element and includes 100 ppm or

TABLE 1

| | Tensile Strength (kgf/mm$^2$) After Heat Treatment | Zn/Sn content in the Internal layer (%) | | Contents of Small Amount-Elements Included in the Internal layer (ppm) | | | | | Average Grain Size (micron-meters) After Heat Treatment |
|---|---|---|---|---|---|---|---|---|---|
| | (As Received) | Zn | Sn | C | N | S | Cl | SUM | (As Received) |
| Example Sample 1-1 | 46.4 (53.7) | 55 | — | 73 | 25 | 10 | 48 | 156 | 0.74 (0.60) |
| Example Sample 1-2 | 54.2 (53.7) | 38 | 84 | 70 | 56 | 11 | 45 | 182 | not measured |
| Example Sample 2 | 67.5 (79.5) | 37 | — | 170 | 64 | 100 | 190 | 524 | 0.31 (0.21) |
| Example Sample 3-1 | 71.3 (81.8) | 67 | — | 302 | 400 | 152 | 13 | 854 | 0.24 (0.22) |
| Example Sample 3-2 | 56.6 (64.4) | 56 | — | 283 | 397 | 156 | 97 | 836 | 0.78 (0.51) |
| Example Sample 3-3 | 75.7 (82.7) | 76 | — | 386 | 575 | 210 | 19 | 1171 | 0.25 (0.24) |
| Comparative Sample 1 | 37.9 (53.7) | — | — | 88 | 24 | 11 | 51 | 174 | 1.1 (0.60) |
| Comparative Sample 2-1 | 9.6 (42.4) | 13 | — | 37 | 32 | 3 | <10 | 72 | 145 (not measured) |
| Comparative Sample 2-2 | 11.7 (42.4) | 11 | — | 39 | 26 | <3 | <10 | 65 | not measured |
| Comparative Sample 2-3 | 10.1 (42.4) | 2 | 14 | 45 | 26 | <3 | <10 | 71 | not measured |

* Tensile strength and the average grain size in parentheses are values as received of an original copper foil used for preparation of Samples.
* "not measured" in Comparative Sample 2-1 to Comparative Sample 2-3 denote inappropriate measurement of average grain size as received due to a strain in processing since a rolled copper foil is used.

TABLE 2

| | Zinc content (%) | | | | |
|---|---|---|---|---|---|
| | | Internal layer | | | Total Mass of zinc in |
| | External layer | First Layer | Second Layer | Third Layer | Entire Copper Foil (% by mass) |
| Example Sample 1-1 | 45 | 26 | 16 | 13 | 0.09 |
| Example Sample 1-2 | 62 | 22 | 9 | 7 | 0.39 |
| Example Sample 2 | 64 | 26 | 5 | 5 | 0.73 |
| Example Sample 3-1 | 33 | 21 | 19 | 26 | 0.34 |
| Example Sample 3-2 | 44 | 20 | 17 | 19 | 0.31 |
| Example Sample 3-3 | 24 | 28 | 27 | 21 | 0.30 |
| Comparative Sample 1 | — | — | — | — | — |
| Comparative Sample 2-1 | 87 | 9 | 3 | 1 | 0.08 |
| Comparative Sample 2-2 | 89 | 9 | 1 | 1 | 0.75 |
| Comparative Sample 2-3 | 98 | 2 | 0 | 0 | 0.30 | more of one or mixture of small amount-elements selected from carbon, sulfur, chlorine and nitrogen, and includes 10% or more of zinc in the total mass of zinc included in the entire copper foil. The zinc included in the internal layer forms compounds with the small amount-elements to achieve miniaturization of grains. Further, a sufficient-level tensile strength can be achieved after a high-temperature heat loading since the fine grains can be maintained. So, the copper foil according to the present invention can be manufactured inexpensively since a zinc alloy is utilized, and can suitably be used as an conductive material including a negative electrode current collector of a lithium ion secondary battery which constitute a member subjected to a high-temperature heat treatment in manufacturing step and required a sufficient mechanical strength after the heat treatment since the copper foil maintains a sufficient-level tensile strength even after heat treatment.

The invention claimed:

1. A copper foil including zinc in a content range of 0.02% by mass to 2.7% by mass in the total mass of the entire copper foil,
   wherein the regions in thicknesses direction from both surfaces of the copper foil that occupy 5% by mass in the total mass of the entire copper foil are referred to as the respective external layers, and a region between one external layer and the other external layer is referred to as an internal layer, the internal layer comprises copper as a main element and includes 100 ppm or more in total of small-amount elements, and includes zinc at 10% or more in the total mass of zinc included in the entire copper foil;

wherein the small-amount elements in the internal layer comprise:
20 to 470 ppm of carbon,
5 to 600 ppm of sulfur,
15 to 600 ppm of chlorine and
about 397 to 600 ppm of nitrogen.

2. The copper foil according to claim 1, wherein a grain size of copper in the internal layer is 1.0 micron-meters or less.

3. The copper foil according to claim 1, wherein the external layer of the copper foil has a concentrated zinc-layer higher in zinc content than the rest of the regions and occupying a part in the external layer.

4. The copper foil according to claim 1, wherein a grain boundary of copper in the internal layer comprises precipitates of a compound composed of
zinc and
one or mixture of elements selected from carbon, sulfur, chlorine and nitrogen.

5. The copper foil according to claim 1, wherein a tensile strength is 40 kgf/mm$^2$ or more.

6. A negative electrode current collector using a copper foil according to claim 1.

7. A negative electrode material of a non-aqueous secondary battery using a negative electrode current collector according to claim 6.

* * * * *